(12) United States Patent
Petter (10) Patent No.: US 7,692,938 B2
(45) Date of Patent: Apr. 6, 2010

(54) MULTIPHASE POWER CONVERTERS AND MULTIPHASE POWER CONVERTING METHODS

(75) Inventor: Jeffrey K. Petter, Williston, VT (US)

(73) Assignee: Northern Power Systems, Inc., Barre, VT (US)

( * ) Notice: Subject to any disclaimer, the term of this patent is extended or adjusted under 35 U.S.C. 154(b) by 148 days.

(21) Appl. No.: 11/850,103

(22) Filed: Sep. 5, 2007

(65) Prior Publication Data

US 2008/0074911 A1    Mar. 27, 2008

Related U.S. Application Data

(60) Provisional application No. 60/842,762, filed on Sep. 6, 2006.

(51) Int. Cl.
  *H02H 7/122* (2006.01)
(52) U.S. Cl. .......................... 363/56; 363/131
(58) Field of Classification Search ................ 323/272, 323/283, 361, 56, 132, 131
  See application file for complete search history.

(56) References Cited

U.S. PATENT DOCUMENTS

| | | | |
|---|---|---|---|
| 5,016,158 A | 5/1991 | Matsui et al. | |
| 5,019,954 A * | 5/1991 | Bourgeault et al. | 363/21.12 |
| 5,245,525 A | 9/1993 | Galloway et al. | |
| 5,253,155 A | 10/1993 | Yamamoto | |
| 5,657,217 A | 8/1997 | Watanabe et al. | |
| 5,852,554 A | 12/1998 | Yamamoto | |
| 6,023,154 A * | 2/2000 | Martinez | 323/272 |
| 6,034,514 A * | 3/2000 | Sakai | 323/225 |
| 6,084,790 A * | 7/2000 | Wong | 363/71 |
| 6,696,823 B2 * | 2/2004 | Ledenev et al. | 323/272 |
| 6,850,045 B2 * | 2/2005 | Muratov et al. | 323/272 |
| 7,449,867 B2 * | 11/2008 | Wu et al. | 323/247 |
| 7,495,421 B2 * | 2/2009 | Weng et al. | 323/272 |
| 2005/0225307 A1 | 10/2005 | Sato et al. | |
| 2006/0023476 A1 | 2/2006 | Fosler | |
| 2006/0071649 A1 | 4/2006 | Schrom et al. | |

* cited by examiner

*Primary Examiner*—Shawn Riley
(74) *Attorney, Agent, or Firm*—Downs Rachlin Martin PLLC

(57) ABSTRACT

A new class of multiphase converters having at least two switching cells driven by out-of-phase PWM reference signals and corresponding respective PWM control signal signals. In some embodiments, once of the switching cells are driven as a function current-balancing feedback so as to balance the currents between the switching cells. Various embodiments of the multiphase converter include one or more unique transformers for averaging the output of the switching cells.

27 Claims, 10 Drawing Sheets

MULTIPHASE POWER CONVERTERS AND MULTIPHASE POWER CONVERTING METHODS

RELATED APPLICATION DATA

This application claims the benefit of priority of U.S. Provisional Patent Application Ser. No. 60/842,762, filed Sep. 6, 2006, and titled "Multiphase Power Converter," which is incorporated by reference herein in its entirety.

FIELD OF THE INVENTION

The present invention generally relates to the field of power electronics. In particular, the present invention is directed to multiphase power converters and multiphase power converting methods.

BACKGROUND

Figure 1:
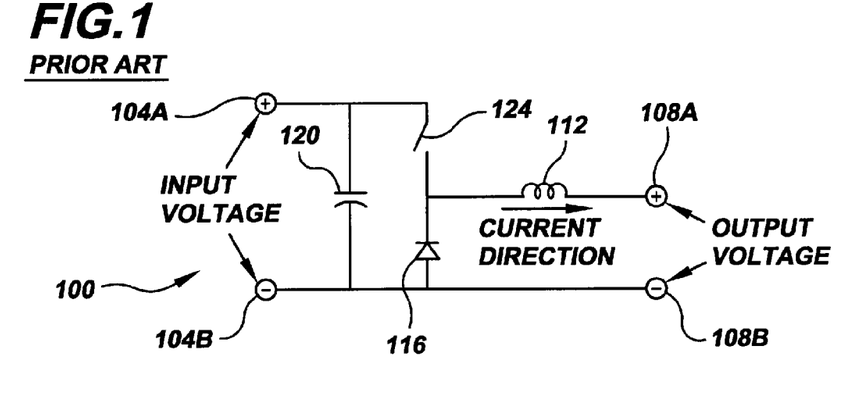
FIG. 1 is a schematic diagram of a conventional buck converter circuit.
Figure 2:
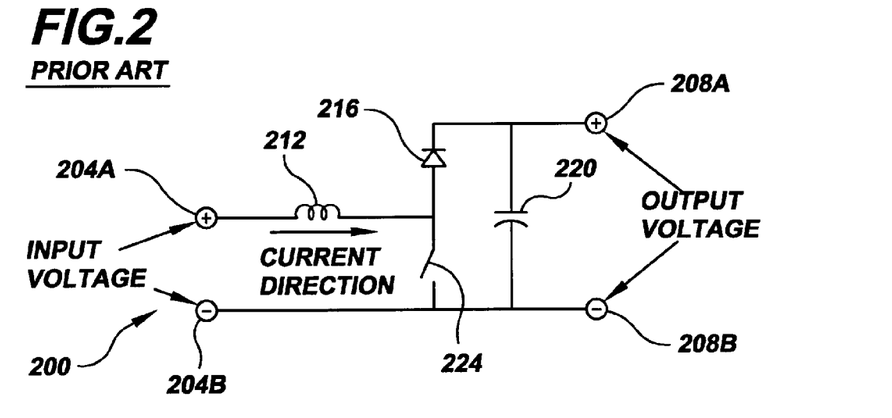
FIG. 2 is a schematic diagram of a conventional boost converter circuit.

Two of the most basic building blocks in power electronics are the buck and the boost converter circuits 100, 200 illustrated in FIGS. 1 and 2, respectively. Each of these converter circuits 100, 200 generally include input nodes 104A-B, 204A-B, output nodes 108A-B, 208A-B, an inductor 112, 212, a diode 116, 216, a smoothing capacitor 120, 220 across the high voltage nodes and a switch 124, 224. The operation of buck and boost converter circuits 100, 200 is well-understood by virtually all power electronics engineers. Typically the switches 124, 224 in these circuits 100, 200 are turned on and off at a constant frequency and with an adjustable duty factor. The duty factor is used to control the input-to-output voltage ratio. Buck and boost circuits 100, 200 can be combined to make the half-bridge circuit 300 shown in FIG. 3 that includes two pairs each consisting of a diode 304, 308 and a switch 312, 316. Half-bridge circuit 300 is a buck converter when current and power are flowing left to right (relative to FIG. 3) and a boost converter in the opposite direction.

Figure 3:
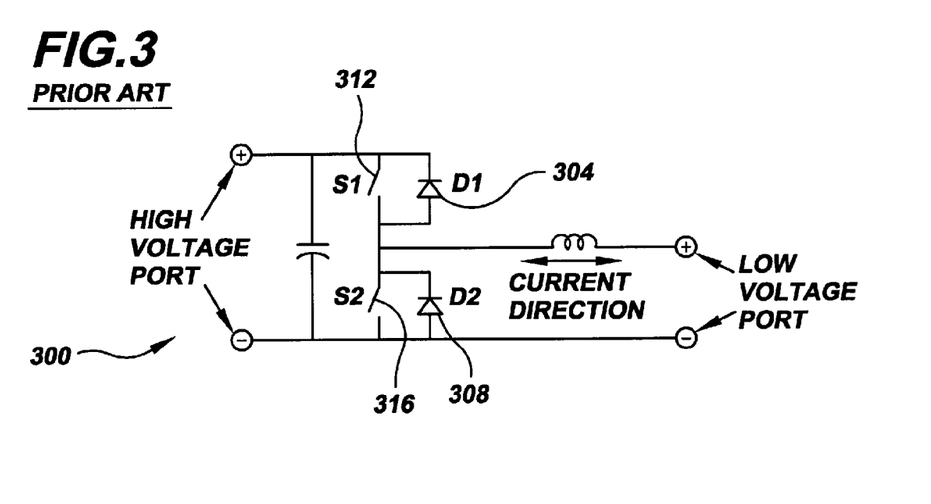
FIG. 3 is a schematic diagram of a conventional half-bridge converter circuit.

Devices used for switches 124, 224, 312, 316 in these switching power converter circuits 100, 200, 300 have included MOSFETs, IGBTs, Bipolar Transistors, GTOs, MCTs, and other power switches that can be turned on and off quickly and relatively easily with minimal power loss and high reliability. All of these devices have some power losses. Because of this power loss, all of these devices cause a limit to the amount of power that can be converted in a specific application.

Figure 4A:
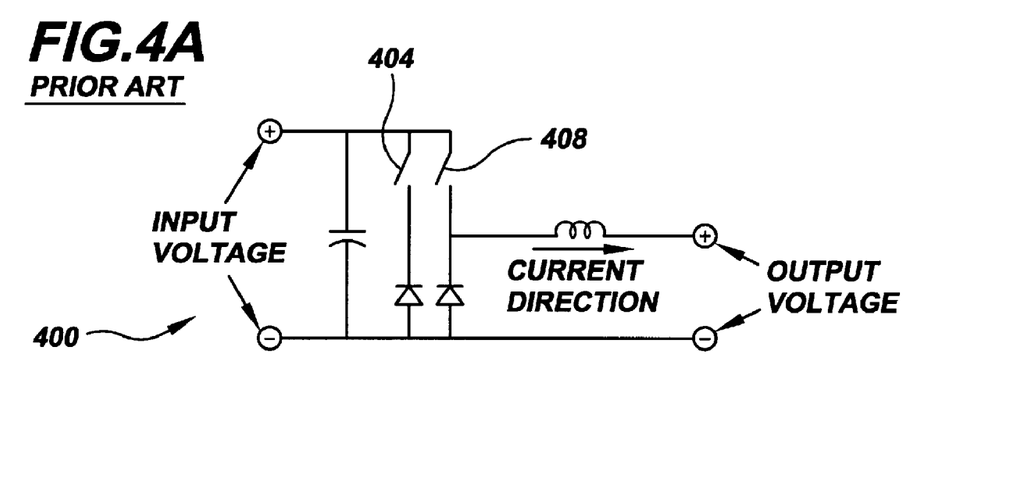
FIG. 4A is a schematic diagram of a conventional buck converter circuit having a plurality of parallel switches.

For higher power applications, it is common for designers to use parallel switching devices to spread the losses in the switches. FIG. 4A illustrates a buck converter circuit 400 having parallel switches 404, 408. Of course, a greater number of switches can be implemented. Two are shown for simplicity. Paralleling the switches in this manner allows better cooling because the heat is spread out. Higher efficiency is also possible. When parallel switches are used in this fashion, all the parallel switches are turned on and off at the same time, thereby acting as one larger switch. There are a number of problems with parallel switching due to uneven sharing of the load current during conduction and during switching.

For higher performance, including better regulation, smaller size, lower weight, faster response, and, up to a point, lower cost, a higher switching frequency is used. A higher switching frequency reduces the size of the magnetic components of the converters. Also, the high frequency makes it possible to regulate the output more quickly. A problem with high switching frequencies is that components get less efficient, thereby limiting the practicality of raising the switching frequency. A conventional approach to getting around this limitation is to use a resonate converter of some type. Resonate converters, in general, however, add to the complexity of the circuits. They tend to have more limited operating ranges and other performance limits, but in some cases are very small and efficient.

Figure 4B:
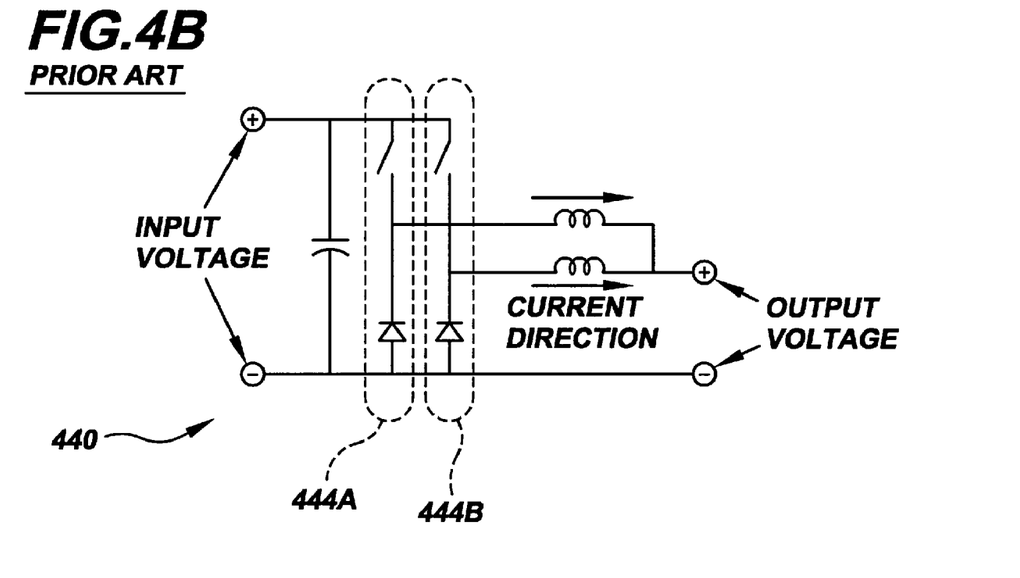
FIG. 4B is a schematic diagram of a conventional multiphase buck converter circuit.

Implementing multiphase converters is another approach to avoiding the limitations of losses due to increased switching frequencies in simple pulse-width modulation (PWM), hard-switched converters. FIG. 4B shows a simple prior art multiphase converter circuit 440. The advantages of multiphase converter circuits, such as circuit 440, have been established in some applications, like the voltage-regulation module (VRM) concepts of Dr. Fred C. Lee at the University of North Carolina. Circuit 440 of FIG. 4B is basically the circuit used by Dr. Lee in his VRM concepts. Advantages of circuit 440 include high bandwidth with lower effective switching frequency, lower ripple current in the DC bus capacitance, higher current capability and smaller size. Circuit 440 is simply one of a whole class of multiphase converters. In general, all multiphase converters are made of either a number of basic buck/boost or half-bridge switching cells, for example, basic buck/boost cells 444A-B of FIG. 4B, arranged in parallel with one another. The switching cells are switched at differing switching times relative to one another but with the same duty cycle and frequency at any instant in time. However, the switching among the cells are phase shifted from each other in various ways.

There are a number of shortcomings associated with conventional multiphase converters. These shortcomings include: their magnetic components are needed to prevent circulating AC currents; their magnetic circuits are typically expensive and complex to design; current balance between the switching cells at low frequency is a problem; control methods are not well established; and switch timing can be complex. The present invention includes features that address all these issues.

SUMMARY OF THE DISCLOSURE

In one embodiment, the present invention is directed to a multiphase power converter. The multiphase power converter includes a number N of switching cells having corresponding respective N switched outputs and an averaging transformer. The averaging transformer includes a common output node and an output in electrical communication with the common output node. The averaging transformer further includes N double-winding segments each including a pair of reactor windings in series with one another. Each of the N double-winding segments has a first end electrically connected to a corresponding respective one of the N switched outputs. A second end of each of the N double-winding segments is electrically connected to the common output node. N interphase reactors are each formed by pairs of the reactor windings in differing ones of the N double-winding segments.

In another embodiment, the present invention is also directed to a multiphase power converter. This multiphase power converter includes a number N of switching cells having corresponding respective N switched outputs. Each of the N switched outputs is controlled by a corresponding respective at least one switching control signal. A control system is provided for controlling the N switching cells. The control system includes means for providing N pulse-width modulation (PWM) reference signals respectively to the N switching cells. Each of the N PWM reference signals is based on a common waveform but has a differing phase relative to each other of the N PWM reference signals. The control system further includes means for providing N PWM control signals and means for generating each of the at least one switching control signal as a function of ones of the N PWM reference signals and corresponding respective ones of the N PWM control signals.

In a further embodiment, the present invention is directed to a method of converting electrical power. The method includes providing a multiphase power converter that includes a number N of switching cells having corresponding respective N switched outputs. N pulse-width modulation (PWM) reference signals having a common waveform but differing phases are provided. N PWM control signals are provided. At least N switching control signals are generated as a function of the N PWM reference signals and the N PWM control signals. The N switching cells are driven with corresponding respective ones of the at least N switching control signals so as to cause the N switching cells to provide the N switched outputs.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 5A:
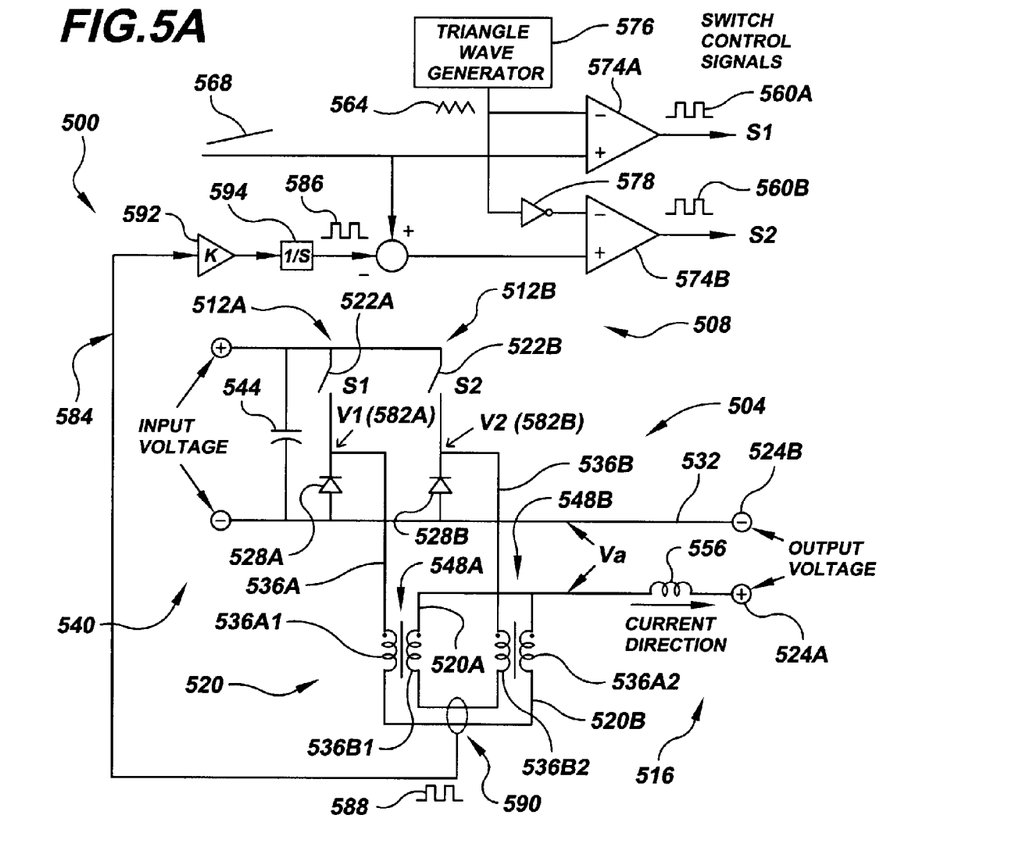
FIG. 5A is a schematic diagram of a multiphase power converter of the present invention comprising two switching cells providing a single phase output signal.

FIG. 5A illustrates a multiphase power converter 500 made in accordance with the present invention. Generally, multiphase power converter 500 comprises converter circuitry 504 and control circuitry 508 that controls the converter circuitry so as to achieve the desired result for a particular application. Converter circuitry 504 includes a plurality of "switching cells" 512A-B, i.e., components similar to the switching portions of conventional converter circuits, such as basic buck/boost and half-bridge converter circuits 100, 200, 300 of FIGS. 1-3. On the low voltage side 516 of converter circuit 504, switching cells 512A-B drive a unique averaging transformer 520 coupled between the switching cells and output node 524A of output nodes 524A-B.

Power converter 500, like power converters 600, 700, 800, 900, 1000 of, respectively, the following FIGS. 6A, 7A, 8, 9, and 10A, form part of a new and unique class of multiphase power converters. When multiphase power converters 500, 600, 700, 800, 900, 1000 and other power converters made in accordance with the present invention are operated with the special timing described, these converters can outperform traditional converters. At a high level, the present invention includes paralleling switching cells (such as switching cells 512A-B of FIG. 5A), using particular magnetic circuit configurations (e.g., averaging transformer 520), on the low-voltage side (such as low-voltage side 516), and specific timing of the switches (e.g., switches 522A-B). The resulting performance improvements over traditional pulse-width modulation (PWM) converters include much less current in the smoothing capacitors on the high voltage side of switching cells, higher control bandwidths, higher efficiency, smaller size, and lower cost, among others. Embodiments of the present invention include defining an entire class of circuits that can provide these improvements, providing improved magnetic circuit configurations (interphase reactors), PWM methods for reducing ripple currents and voltages on various components, methods for balancing current in the new class of power converters and other power converters containing parallel switching cells, and methods of controlling the new class of power converters. These and other embodiments of the present invention are described below in detail.

Figure 5B:
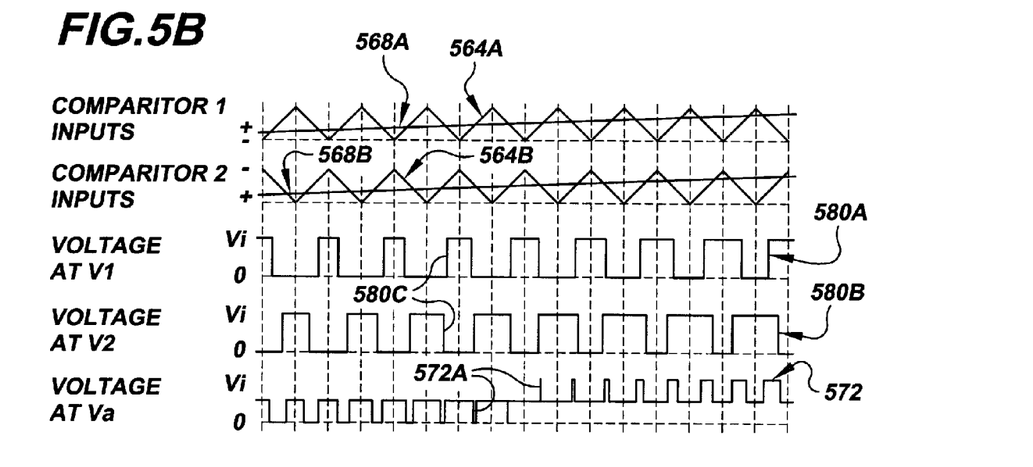
FIG. 5B is a timing diagram for the multiphase power converter of FIG. 5A for a PWM reference voltage signal having a triangular waveform and a PWM control signal having a linearly increasing voltage.

Referring again to FIG. 5A, and also to FIG. 5B, in the present example, switching cells 512A-B are of the basic buck/boost type, but in other embodiments these switching cells could be of another type, such as the half-bridge type illustrated in FIGS. 6A, 7A, 8, 9, and 10A. In addition to switches 522A-B, each switching cell 512A-B may include a respective diode 528A-B for controlling the direction of current flow in that cell between voltage node 532 and the output 536A-B of that cell. The high-voltage side 540 of converter circuit 504 may include a smoothing capacitor 544 that performs largely the same function as similarly situated smoothing capacitors of conventional power converters. Averaging transformer 520 includes first and second interphase reactors 548A-B that each include a reactor winding 536A1, 536A2 electrically coupled to output 536A of switching cell 512A and a reactor winding 536B1, 536B2 electrically coupled to output 536B of switching cell 512B. Averaging transformer 520 may be coupled to output node 524A through a suitably sized output inductor 556.

Control circuitry 508 provides switch control signals 560A-B that drive, respectively, switches 522A-B of corresponding switching cells 512A-B. In general, control circuitry 508 drives switches 522A-B as a function of a PWM reference signal 564, for example, a fixed frequency repeating waveform such as triangular waveform 564A of FIG. 5B, and a PWM control signal 568 that determines the overall character of the waveform of the output signal 572 (voltage) (FIG. 5B) output on output nodes 524A-B. In the present case, the waveform 568A of PWM control signal 568 for the time period illustrated is a linearly increasing waveform. PWM reference signal 564 and PWM control signal 568 may be used to generate switch control signals 560A-B in any suitable manner, such as the analog comparators 574A-B shown.

Control circuit 508 may include a reference signal generator 576 that generates PWM reference signal 564 having triangular waveform 564A. Since converter circuit 504 has two switching cells 512A-B and it is necessary to drive these cells out of phase with one another, control circuitry 508 may include a suitable means for providing a second triangular waveform 564B (FIG. 5B) that is essentially the same as triangular waveform 564A, but is out of phase with triangular waveform 564A. In the present example, the phase difference is provided by an inverter 578 that provides comparator 574B with a waveform 564B that is a full 180° out of phase with waveform 564A. Those skilled in the art will readily appreciate that there are other ways to provide two different phases, such as with a multiphase signal generator, utilizing various delay elements, or locating inverter 578, for example, downstream of comparator 574B. Those skilled in the art will also readily understand that although control circuit 508 is shown as being an analog circuit, control circuit could readily be implemented in a digital circuit or modeled in software.

Comparator 574A compares non-inverted PWM reference waveform 564A to PWM control waveform 568A and generates a pulse during the period that the magnitude of PWM reference waveform 564A falls below the magnitude of PWM control waveform 568A. This is illustrated with pulsed waveform 580A (FIG. 5B) that represents the voltage at node 582A of switching cell 512A (FIG. 5A). Comparator 574B works in essentially the same way as comparator 574A, except that instead of utilizing PWM control waveform 568A as is, comparator 574B utilizes a modified PWM control waveform 568B (FIG. 5B) obtained via a feedback loop 584. Modified PWM control waveform 568B is created from modifying PWM control waveform 568A using a feedback signal 586 that is a function of a current differential signal 588 that represents the differential between the currents in outputs 536A-B of, respectively, switching cells 512A-B. Current differential signal 588 may be obtained in any of a number of ways, such as using a differential current sensor 590 in averaging transformer 520 between interphase reactors 548A-B. Feedback loop 584 may include a gain amplifier 592 and an integrator 594 for conditioning current differential signal 588 into feedback signal 586. Pulsed waveform 580B (FIG. 5B) represents the voltage at node 582B that is controlled by switch control signal 560B. Pulsed waveform 572 of FIG. 5B illustrates the voltage across output nodes 524A and 524B after outputs 536A-B have been combined by averaging transformer 520. It is clearly seen from FIG. 5B that pulsed waveform 572 provides a good representation of PWM control waveform 568A.

Still referring to FIGS. 5A-B, it is noted that frequency of the output pulsed waveform 596 is twice the frequency of each switch control signal 560A-B (as represented by voltage waveforms 580A-B) and that the output voltage steps 572A are half the size of the corresponding steps 580C of voltage waveforms 580A-B. Each of these characteristics reduces the size of output inductor 556 required by one-half so that the output inductance required is one-quarter of what it would have been if switches 522A-B were switched at the same time. Also, due to the phase difference between PWM reference waveforms 564A-B, the pulse-width decisions are made four times, rather than two, for each switching cycle, thereby improving response time by a factor of two. In addition, the response time of converter circuit 504 (FIG. 5A) is also improved by the lower inductance of output inductor 556. The currents in outputs 536A-B are balanced via feedback loop 584 so that the devices used for switches 522A-B do not require any special matching. Another benefit of multiphase power converter 500 is that the current ripple in the smoothing capacitor 544 is reduced, making it possible to reduce the size of the capacitor used or improve its efficiency and life. The reduction of capacitor current occurs due to the phase shifting of the DC current in the two switching cells 512A-B, causing the largest ripple current frequencies to have opposing phases so as to cancel each other.

As can be readily seen in FIG. 5A, averaging transformer 520 may be considered to include 1) an "outer loop" 520A electrically connected at one end to output node 582A of switching cell 512A and at the other end to output inductor 556 and 2) an "inner loop" 520B electrically connected at one end to output node 582B of switching cell 512B and at the other end to output inductor 556. This configuration allows inductor windings 536A1, 536B1 associated with respective switching cells 512A-B to form one reactor 548A and inductor windings 536A2, 536B1 associated with respective switching cells 512A-B to form second reactor 548B. Differential current sensor 590 is also readily seen as being located between reactor windings 536A1, 536A2 of outer loop 520A and between reactor windings 536B1, 536B2 of inner loop 520B. Other details of averaging transformer 520 may be discerned from the description of similar averaging transformers 1200, 1204 of FIGS. 12A and 12B, respectively.

Compared to conventional power converters, the cost of these improvements generally include the addition of a differential current sensor (here, sensor 590), the addition of an averaging transformer (here, transformer 520), additional switch-driving circuitry (here, e.g., comparator 574B, inverter 578, and feedback loop 584), and more complex control. However, averaging transformer 520 is typically smaller than the output inductor in a conventional design, so that the total size of all of the magnetic components in multiphase converter 500 is generally less than the total size of the magnetic components of a conventional simple buck converter. In most applications, a multiphase converter of the present invention, such as multiphase converter 500, will be lower in cost, more efficient, higher in speed, smaller in size, and weigh less than a traditional hard-switched PWM converter.

Figure 6A:
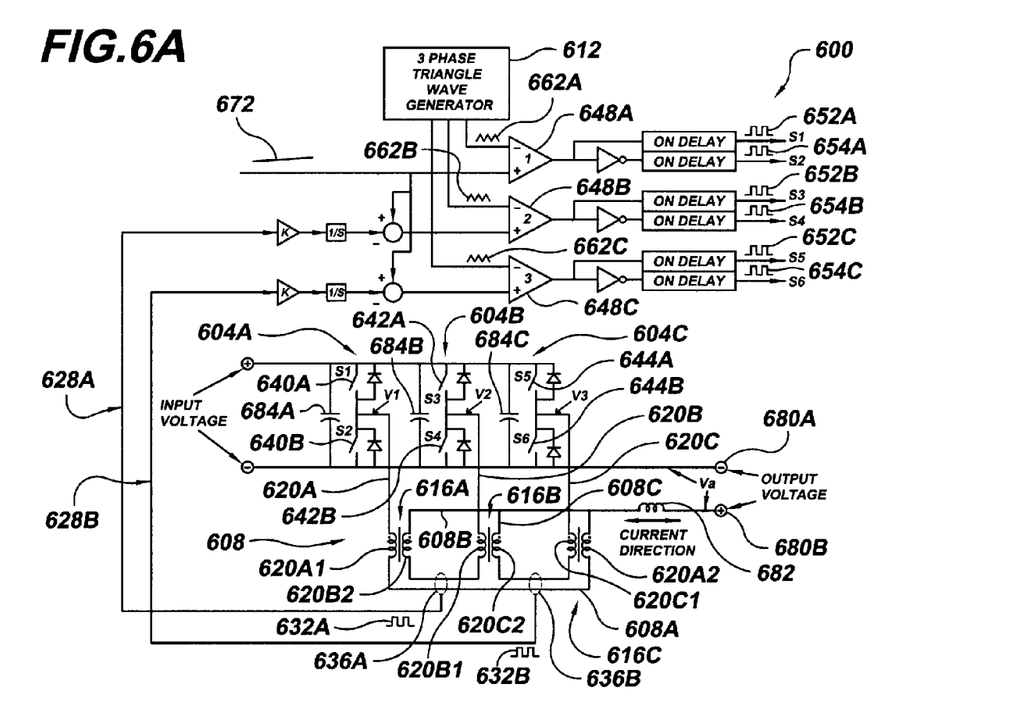
FIG. 6A is a schematic diagram of a multiphase power converter of the present invention comprising three switching cells providing a single phase output signal.

Multiphase power converter 500 of FIG. 5A is a simple form of the invention. However, the basic concepts behind multiphase power converter 500 can be used to make virtually any type of power converter. For example, FIG. 6A shows a bi-directional DC-to-DC multiphase power converter 600 that employs three parallel switching cells 604A-C, which in this example are half-bridge cells similar to the half-bridge power converter 300 of FIG. 3. Other than switching cells 604A-C being of a different type relative to switching cells 512A-B of FIG. 5A, multiphase converter 600 of FIG. 6A is an extension of multiphase converter 500 of FIG. 5A. That is, instead of multiphase converter 600 having just two switching cells 604A-B, it has a third switching cell 604C and modifications and additional circuitry for accommodating the additional cell. The modifications of multiphase power converter 600 relative to multiphase converter 500 include a different averaging transformer 608 and a different reference waveform generator 612.

Averaging transformer 608 includes three interphase reactors 616A-C instead of the two interphase reactors 548A-B of FIG. 5A so as to account for all three phases. It is noted that the basic principles of averaging transformer 608 of FIG. 6A and averaging transformer 520 of FIG. 5A are the same. That is, each output 620A-C of respective switching cells 604A-C is connected to a respective loop 608A-C, with loop 608A being considered an "outside loop" and each of loops 608B, 608C being considered an "inside loop." Each loop 608A-C includes a corresponding respective pair of reactor windings 620A1-2, 620B1-2, 620C1-2. In the present example, interphase reactor 616A includes reactor windings 620A1 and 620B2 of outputs 620A and 620B, respectively, interphase reactor 616B includes reactor winding 620B1 and 620C2 of outputs 620B and 620C, respectively, and interphase reactor 616C includes reactor windings 620C1 and 620A2 of outputs 620C and 620A, respectively. Other details of averaging transformer 608 may be discerned from the description of similar averaging transformers 1200, 1204 of FIGS. 12A and 12B, respectively.

Reference waveform generator 612, like reference waveform generator 576 of FIG. 5A, is a triangular waveform generator, however, it is a three-phase generator that generates the three out-of-phase reference waveforms 624A-C (FIG. 6B) corresponding respectively to the three switching cells 604A-C. Reference waveform generator 612 may be of any suitable design and may be analog, digital, or simulated in software. As those skilled in the art will appreciate, in alternative embodiments, three-phase reference waveform generator 612 may be replaced with a single phase waveform generator and the differing phases generated using inverters and/or other delay elements.

Additional circuitry for accommodating the additional switching cell 604C includes a second feedback loop 628B (in addition to feedback loop 628A that generally corresponds to feedback loop 584 of FIG. 5A). Feedback loop 628A feeds back a first current differential signal 632A corresponding to a difference between the currents of outputs 620A and 620B and a second current differential signal 632B corresponding to a difference between the currents of outputs 620A and 620C as measured, respectively, by differential current sensors 636A-B. As with multiphase power converter 500 of FIG. 5A, suitable feedback signals for correcting current imbalances among the several switching cells 604A-C may be obtained in a number of alternative ways other than using differential current sensors 636A-B and/or locating these sensors at averaging transformer 608.

In addition to the modifications and additional circuitry for accommodating the additional switching cell 604C relative to multiphase power converter 500 of FIG. 5A, other differences exist as a result of each switching cell 604A-C having a pair of switches 640A-B, 642A-B, 644A-B. Switch pairs 640A-B, 642A-B, 644A-B are driven by corresponding respective comparators 648A-C. One switch 640A, 642A and 644A in each pair is driven by a corresponding respective switch control signal 652A-C that has the same phase as the output of the corresponding comparator 648A-C, and the other switch 640B, 642B, 644B in each pair is driven by a corresponding respective switch control signal 654A-C that is 180° out of phase with the output of the corresponding comparator. Thus, the switch pairs are driven with exact opposite phasing.

Figure 6B:
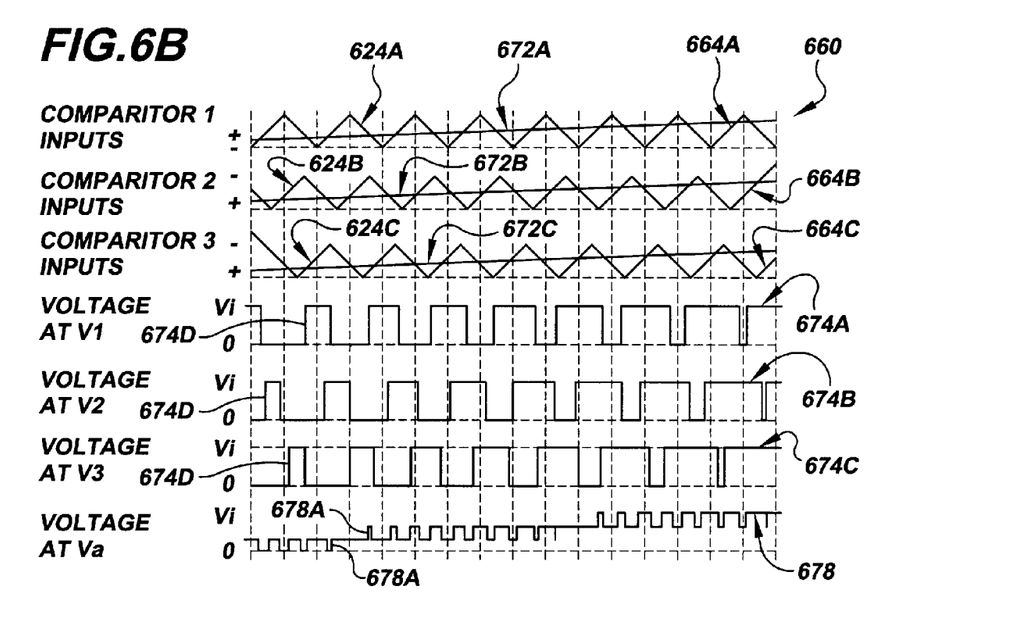
FIG. 6B is a timing diagram for the multiphase power converter of FIG. 6A for a PWM reference voltage signal having a triangular waveform and a PWM control signal having a linearly increasing voltage.

FIG. 6B illustrates a timing diagram 660 for power converter 600 in which the PWM reference signals 662A-C (FIG. 6A) provided, respectively, to comparators 648A-C are out-of-phase triangular waveforms 664A-C of which waveform 664B has a one-third-of-a-cycle phase lag relative to waveform 664A and waveform 664C has a two-thirds-of-a-cycle phase lay relative to waveform 664A. Like the example of FIGS. 5A-B, PWM control signal 672 (FIG. 6A) has a linearly increasing waveform 672A for the time period illustrated, as do each of modified PWM control signals 672B and 672C modified, respectively, as a function of the feedback of current differential signals 632A-B. Pulsed waveforms 674A-C represent the voltages at cell nodes 676A-C, respectively, that result from the operation of corresponding switches 640A-B, 642A-B, 644A-B in response to respective switch control signals 652A-C, 654A-C. Waveform 678 represents the voltage across output nodes 680A-B and is the average of the three waveforms 674A-C. Note that the individual pulses 678A on waveform 678 have a pulse height equal to one-third the height of the individual pulses 674D on waveforms 674A-C due to averaging. For the same reasons that output inductor 556 of multiphase power converter 500 of FIG. 5A needed an inductance of one-quarter the inductance needed in a conventional single switch power converter, the inductance of output inductor 682 of multiphase power converter 600 of FIG. 6A is one-ninth the inductance required for the output inductor of a single switch power converter operating at the same frequency.

While multiphase power converters 500, 600 of FIGS. 5A and 6A include, respectively, two switching cells 512A-B and three switching cells 604A-C, it should be clear that a multiphase power converter of the present invention could be made to include any number of paralleled switching cells. The modifications necessary, for example, to the averaging transformer and regarding the addition of current balancing feedback loops, can readily be extrapolated from the modifications made in expanding the two-cell power converter 500 of FIG. 5A to the three-cell power converter 600 of FIG. 6A. That said, FIGS. 7A, 8, 9, and 10A illustrate, respectively, other multiphase power converters 700, 800, 900, 1000 made using the underlying broad concepts of the present invention.

Figure 7A:
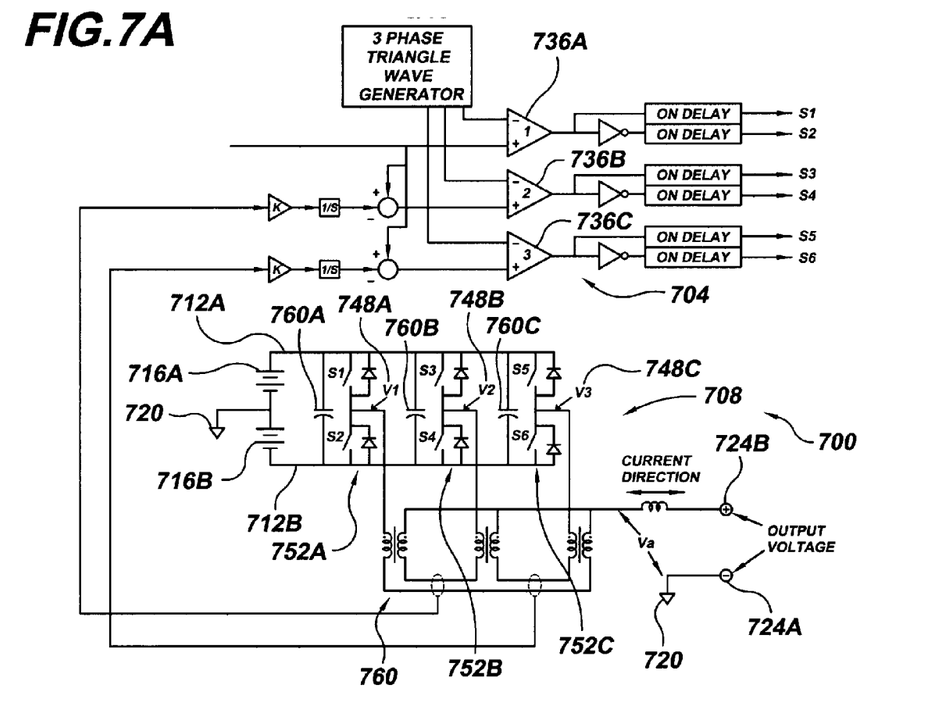
FIG. 7A is a schematic diagram of an alternative multiphase power converter of the present invention comprising three switching cells providing a single-phase output signal.

More particularly, multiphase power converter 700 of FIG. 7A is a switch mode power amplifier or single-phase inverter made in accordance with the present invention. As seen in FIG. 7, control circuit 704 is identical to the control circuit portion of power converter 600 of FIG. 6A. However, power converter circuit 708 is different from the converter circuit portion of power converter of FIG. 6A in that nodes 712A-B in FIG. 7A are driven by respective DC power supplies 716A-B connected to ground 720 and one output node 724A of the two output nodes 724A-B is connected to ground 720.

Figure 7B:
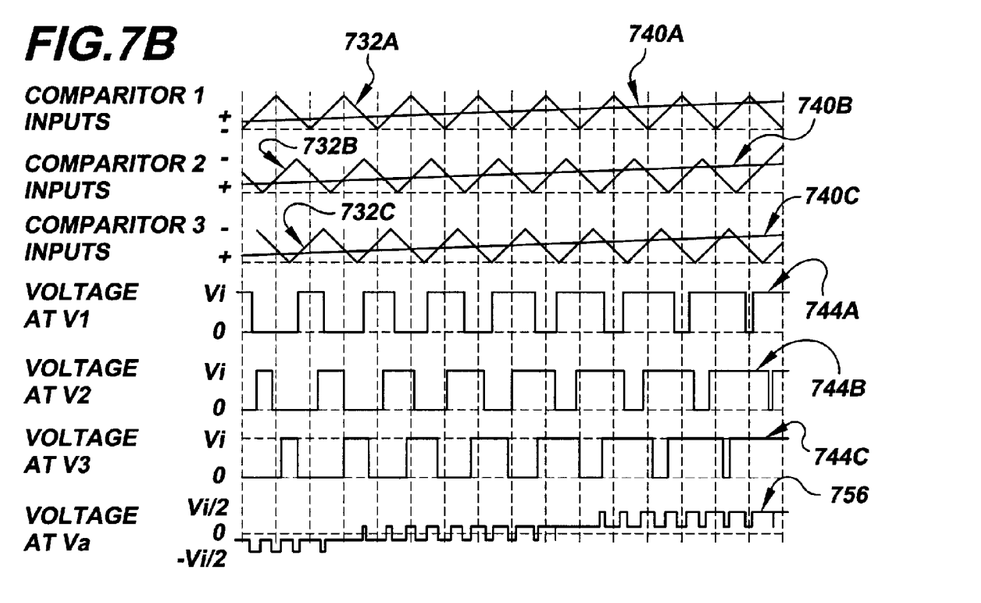
FIG. 7B is a timing diagram for the multiphase power converter of FIG. 7A for a PWM reference voltage signal having a triangular waveform and a PWM control signal having a linearly increasing voltage.

A timing diagram 728 for multiphase power converter 700 is shown in FIG. 7B. Like timing diagram 660 of FIG. 6A, timing diagram 728 of FIG. 7B shows: the three out-of-phase triangular waveforms 732A-C input into corresponding respective comparators 736A-C; the PWM control signal waveform 740A and its feedback modified counterparts 740B-C input into the corresponding respective comparators; the pulsed voltage waveform 744A-C at each of the three nodes 748A-C (FIG. 7A) of switching cells 752A-C due to being driven by control circuit 704; and the output voltage waveform 756 across output nodes 724A-B. In this configuration, the output at output nodes 724A-B is a full four-quadrant power-amplified output, with the possibility to make both polarities of current and voltage in any combination. Multiphase power converter 700 of FIG. 7A can have very high speed and power with small size and high efficiency.

Referring again to FIG. 7A, it is readily seen that multiphase power converter 700 includes an averaging transformer 760 having the same overall configuration as averaging transformer 608 of FIG. 6A. This is due to the virtual identity of switching cells 752A-C of converter 700 of FIG. 7A to switching cells 604A-C of converter 600 of FIG. 6A. This is why control circuitry 704 of converter 700 can be identical to the control circuitry of converter 600 of FIG. 6 as mentioned above.

Figure 8:
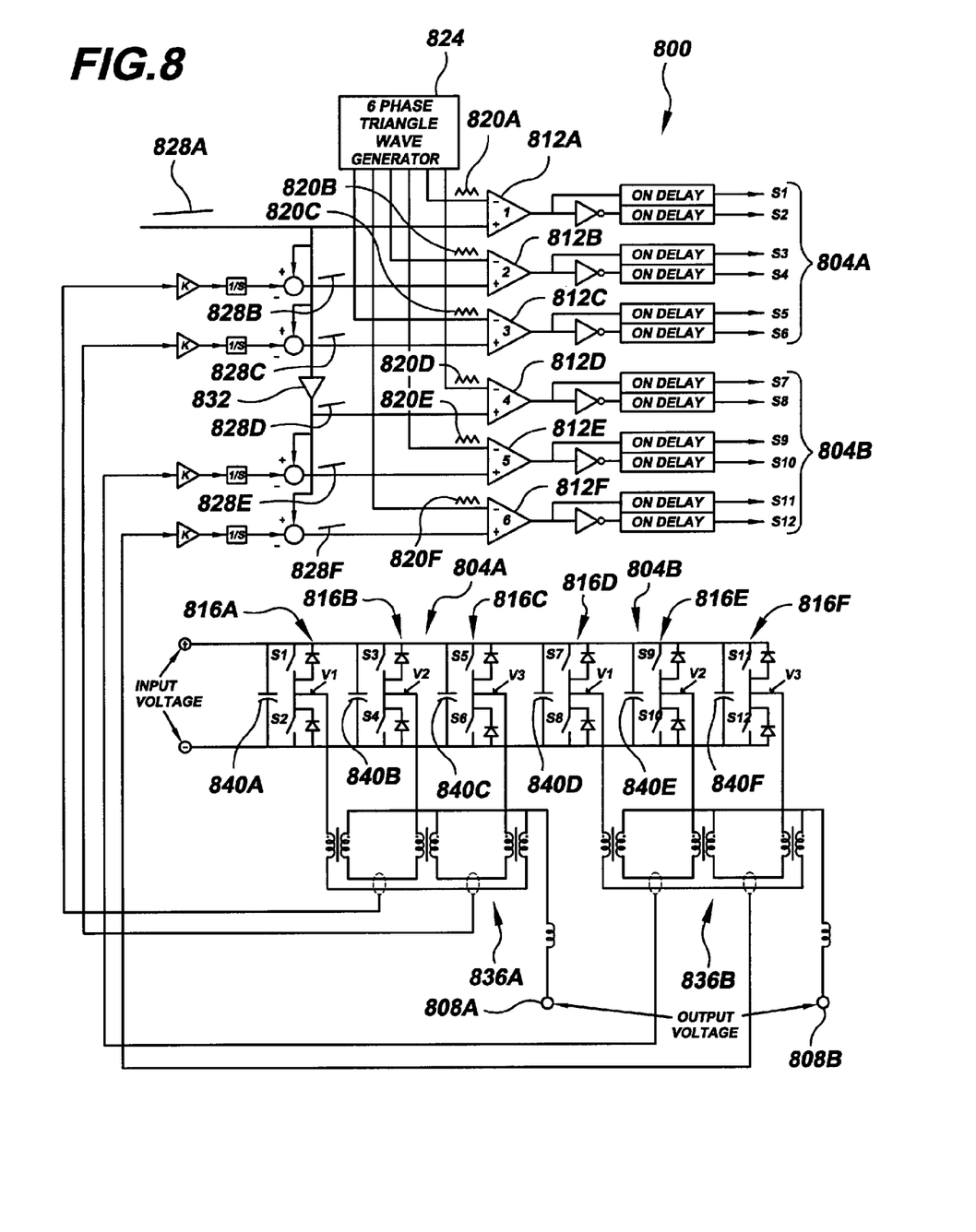
FIG. 8 is a schematic diagram of a multiphase power converter of the present invention comprising six switching cells providing a single phase output signal.

Multiphase power converter 800 of FIG. 8 may be used as, for example, a power amplifier or a high performance single-phase inverter. Generally, multiphase power converter 800 can be thought of as comprising two multiphase converters 804A-B each substantially the same as multiphase converter 600 of FIG. 6A. In this case, one multiphase converter 804A drives one output node (here, node 808A) and the other converter 804B drives the other output node (here, node 808B). In this arrangement, comparators 812A-C drive corresponding respective switching cells 816A-C and comparators 812D-F drive corresponding respective switching cells 816D-F. Each of comparators 812A-F receives a corresponding respective out-of-phase PWM reference signal 820A-F, in this case from a six-phase triangular waveform generator 824. One of comparators 812A-C associated with output node 808A, i.e., comparator 812A, receives an unmodified PWM control signal 828A, while the other two comparators 812B-C receive corresponding respective feedback modified PWM control signals 828B-C. One of comparators 812D-F associated with output node 808B, i.e., comparator 812D, receives a polarity-shifted PWM control signal 828D (shifted by polarity shifter 832), while the other two comparators 812E-F receive corresponding respective feedback modified polarity shifted PWM control signals 828E-F. Each of multiphase converters 804A-B is in communication with a corresponding respective averaging transformer 836A-B that is essentially the same as averaging transformer 608 of FIG. 6A. All things being equal, multiphase converter 800 has a higher output voltage than multiphase converter 700 of FIG. 7A as a result of the manner in which output nodes 808A-B are driven.

Figure 9:
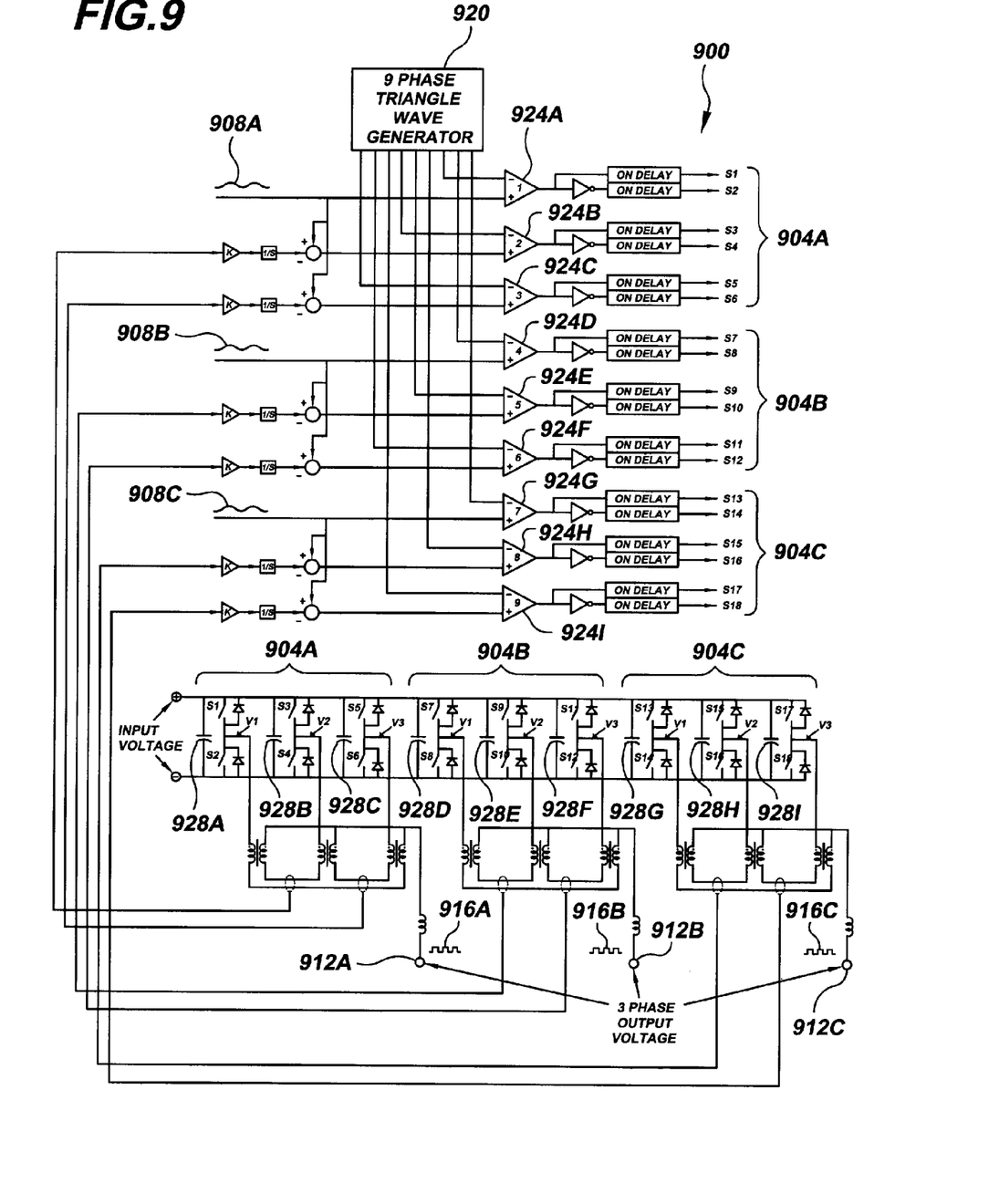
FIG. 9 is a schematic diagram of a multiphase power converter of the present invention comprising nine switching cells providing a three-phase output signal.

Multiphase power converter 900 of FIG. 9 may be used, for example, as a three-phase inverter or a motor drive. Multiphase converter 900 may be considered to include three multiphase converters 904A-C, each essentially identical to multiphase converter 600 of FIG. 6A. In this case, each of multiphase converters is controlled by a respective PWM phase control signal 908A-C so as to drive a corresponding respective output node 912A-C with a respectively phased output signal 916A-C. Other than the fact that a nine-phase reference waveform generator 920 is used to provide out-of-phase waveforms (not shown) to the nine corresponding respective comparators 924A-I, other differences of multiphase converter 900 relative to multiphase converter 600 of FIG. 6A are simply due to the connectedness of the three multi-phase converters 904A-C. Those skilled in the art will readily understand the operation of multiphase converter upon studying FIG. 9.

Figure 10A:
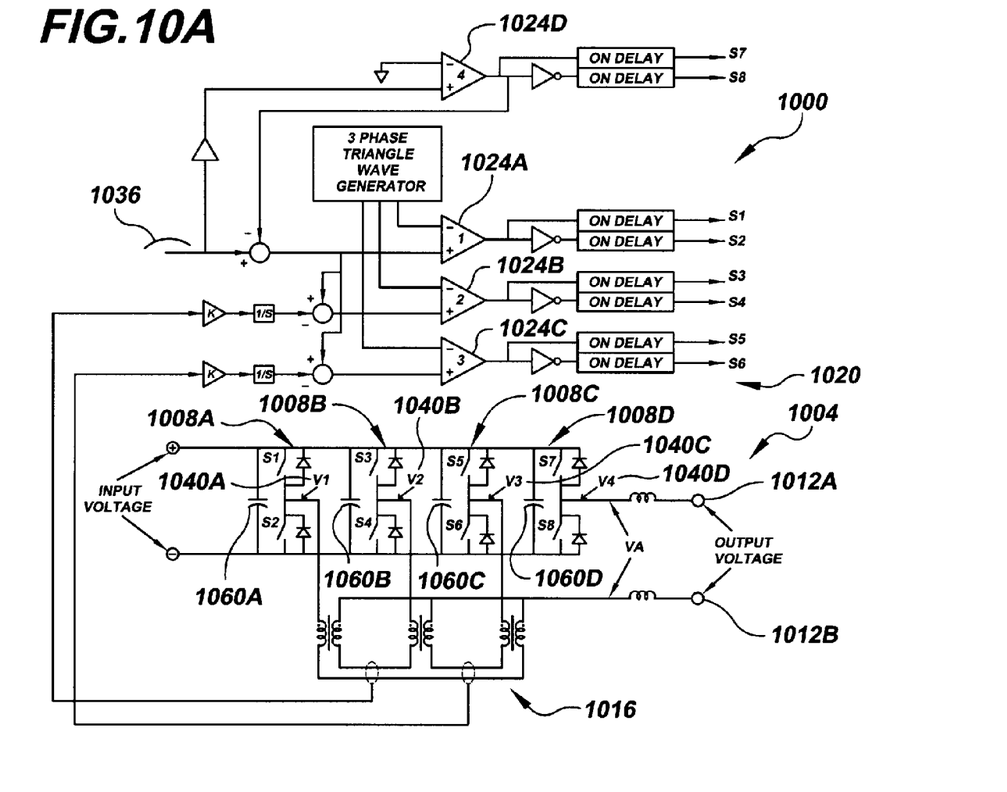
FIG. 10A is a schematic diagram of a multiphase power converter of the present invention comprising four switching cells providing a single phase output signal.

Multiphase power converter 1000 of FIG. 10A illustrates another alternative embodiment of a single-phase inverter. Multiphase converter 1000 is largely the same as multiphase converter 600 of FIG. 6A, except that converter circuit 1004 includes an additional switching cell 1008D, which is in addition to the three switching cells 1008A-C that correspond to switching cells 604A-C of FIG. 6A, that drives one output node 1012A of the two output nodes 1012A-B. Output node 1012B is driven by averaging transformer 1016 that may have a configuration identical to averaging transformer 608 of FIG. 6A.

Figure 10B:
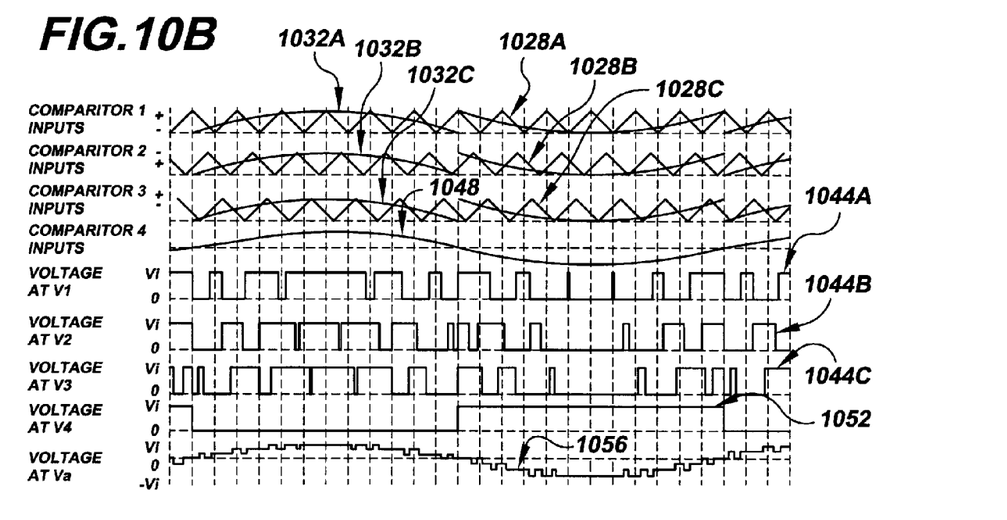
FIG. 10B is a timing diagram for the multiphase power converter of FIG. 10A for a PWM reference signal having a triangular waveform and a PWM control signal having sinusoidal waveform.

The other primary difference between multiphase power converter 600 of FIG. 6A and power converter 1000 of FIG. 10A is the way control circuit 1020 is configured to drive the four switching cells 1008A-D. Like power converter 600 of FIG. 6A, comparators 1024A-C receive, respectively, out-of-phase PWM reference waveforms 1028A-C (FIG. 10B) and PWM control waveforms 1032A-C, which are derived from a single input PWM control signal 1036 as shown. Generally, the output of comparators 1024A-C drive, respectively, switching cells 1008A-C. With PWM reference waveforms 1028A-C and PWM control waveforms 1032A-C as shown in FIG. 10B, the voltage waveforms at switching cell nodes 1040A-C (FIG. 10A) are, respectively, pulsed waveforms 1044A-C of FIG. 10B.

Comparator 1024D (FIG. 10A) that corresponds to switching cell 1004D receives only a modified waveform 1048 (FIG. 10B) of PWM control signal 1036 (FIG. 10A), i.e., it does not receive a PWM reference signal waveform as do comparators 1024A-C. Consequently, the voltage waveform at switching cell node 1040D is the pulsed waveform 1052 shown in FIG. 10B that is much different in character than pulsed waveforms 1044A-C. The output voltage waveform 1056 (FIG. 10B) appearing across output nodes 1012A-B is a result of the difference between the average of waveforms 1044A-C that generally is present at output node 1012B and the waveform 1052 output from the fourth switching cell 1004D that generally is present at output node 1012A.

It should be clear to those skilled in the art from multiphase power converter 1000 of FIG. 10A and converters 500, 600, 700, 800, 900 of FIGS. 5A, 6A, 7A, 8, and 9, respectively, that the underlying broad concepts of the present invention are very versatile and that the possible multiphase converter configurations made using these underlying concepts are many.

Magnetic Circuits for Multiphase Converters

Each of the forgoing multiphase power converters having switching cells that each contain two switches in electrical series (i.e., converters 600, 700, 800, 900, 1000 of FIGS. 6A, 7A, 8, 9, and 10, respectively) has capacitors (i.e., capacitors 684A-C, 760A-C, 840A-F, 928A-I, 1060A-D) connected across the series switches at the high voltage side and magnetic devices (e.g., averaging transformers 608, 760 836A-B, 1016) connected between the switch junction and respective output nodes (i.e., output nodes 680B, 724B, 808A-B, 912A-C, 1012B). The voltage at the switch junction is either the positive or the negative terminal of the capacitor depending on the state of the switches. Each switching cell can be considered a two level voltage source providing a voltage waveform to the magnetic circuit. The switching waveforms generated by each switching cell for the illustrated multiphase converter designs of FIGS. 6A, 7A, 8, 9, and 10 can be considered identical, except for being shifted in time by some fraction of a switching cycle. The corresponding magnetic circuits are each connected to multiple ones of these switch junctions driving a common output node. The function of these magnetic circuits is to sum the currents from corresponding switching cells while keeping the current from the individual cells equal, i.e., balanced.

Figure 11A:
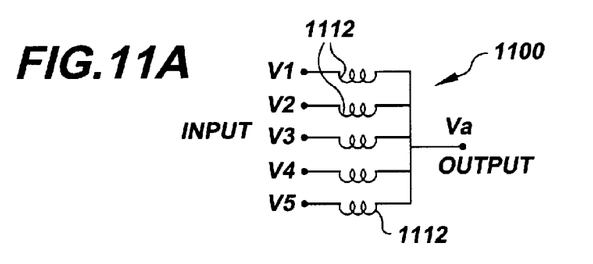
FIGS. 11A-C are each a schematic diagram illustrating a conventional magnetic current summing circuit that may be used in a multiphase power converter of the present invention.
Figure 11B:
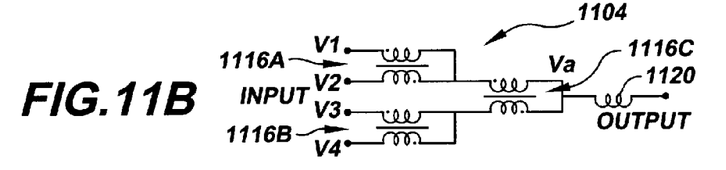
Figure 11C:
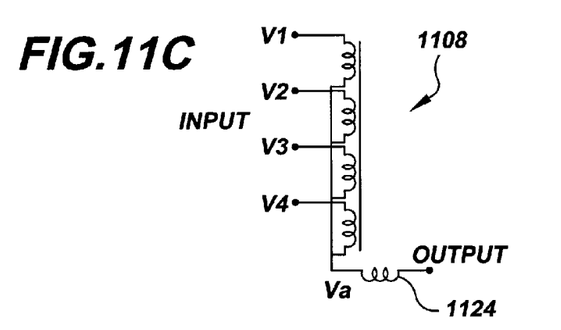

FIGS. 11A-C illustrates conventional multiphase converter current summing circuit types that may be used in lieu of the averaging transformers, for example, transformers 520, 608, 836A-B, shown in FIGS. 5A, 6A, 7A, 8, 9, 10A. FIG. 11A shows a simple series inductor circuit 1100; FIG. 11B shows a dual-input interphase reactor 1104; and FIG. 11C shows a multi-legged interphase reactor circuit 1108. Simple series inductor circuit 1100 (FIG. 11A) can work fine. However, the inductance of each individual inductor 1112 needs to be high to prevent large circulating ripple currents. The cost is high and leads to a large impedance in series with the output limiting the response time of the circuit. Dual input interphase reactor circuit 1104 (FIG. 11B) works better. With circuit 1104, the circulating current impedance or differential voltage impedance of the circuit is controlled independently of the parallel or common mode voltage impedance. Ideally, the three interphase reactors 1116A-C provide only the differential voltage impedance and the output inductor 1120 provides the common mode impedance. In practice, interphase reactors 1116A-C provide some common mode impedance. If designed correctly, the common mode impedance of interphase reactors 1116A-C can have the right value so no output inductor is required. Circuit 1104 is probably the circuit of choice for a two-input circuit. The problems with circuit 1104 arise when more inputs are required. It can only be used when the number of inputs is a power of 2, for example, 2, 4, 8, 16, etc. In addition, the magnetic components required for each level of current summation are very different. At each successive level, the current doubles, the ripple current frequency doubles, and the differential volt seconds drops by a factor of four. This makes for very different designs.

Multi-leg interphase reactor circuit 1108 (FIG. 11C) solves the problem of only being able to use powers of two numbers of inputs. However, a shortcoming of circuit 1108 is that it requires special cores. Also, it is not possible to design the common mode and the differential mode impedances to all be equal between all pairs of inputs. Consequently, this type of circuit 1108 must always be designed with minimum common mode impedance, and an output inductor 1124 must be used. The construction of this type of interphase reactor is described in U.S. Pat. No. 5,852,554 to Yamamoto, which is incorporated by reference herein in its entirety.

Figure 12A:
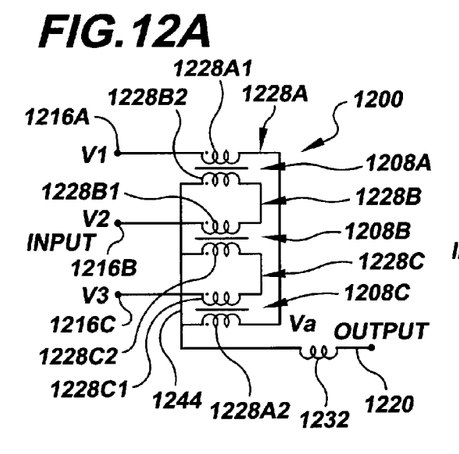
FIGS. 12A-B are each a schematic diagram illustrating a magnetic current summing circuit of the present invention that may be used in a multiphase power converter, such as a multiphase power converter of the present invention.
Figure 12B:
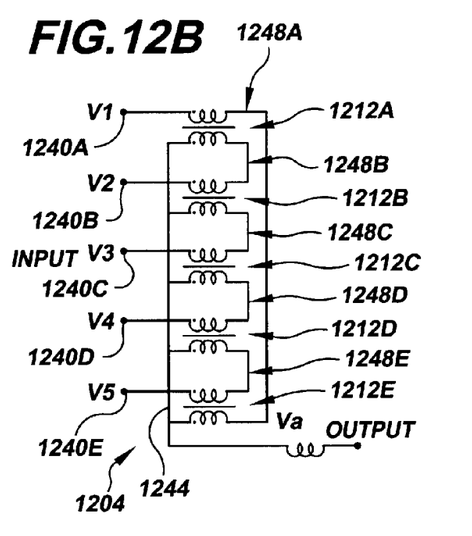

While the types of summing circuits 1100, 1104, 1108 shown in FIGS. 11A-C may be used in a multiphase power converter of the present invention, for example, as a substitution for the averaging transformers illustrated in each of FIGS. 5A, 6A, 7A, 8, 9, and 10A, the averaging transformers shown in these figures can provide certain benefits. FIGS. 12A-B illustrate, respectively, a three-input current averaging transformer circuit 1200 (essentially identical to each of the three-input averaging transformers shown in FIGS. 6A, 7A, 8, 9, 10A) and a five-input averaging transformer circuit 1204. Each of circuits 1200, 1204 uses a number of interphase reactors 1208A-C, 1212A-E, respectively. Generally, what sets each of circuits 1200, 1204 physically apart from conventional reactor circuits, such as dual-input interphase reactor 1104 of FIG. 11B, is the unique way in which interphase reactors 1208A-C, 1212A-E are connected within the respective circuit 1200, 1204.

Referring first to FIG. 12A, it can be readily seen that averaging transformer circuit 1200 is essentially identical to each of the three-reactor averaging transformers 608, 760, 836A-B, and 1016 shown in corresponding respective ones of FIGS. 6A, 7A, 8 and 10A, as well as the corresponding averaging transformers shown, but unlabeled, in FIG. 9. Transformer circuit 1200 has three inputs 1216A-C (which would correspond to the outputs of corresponding respective switching cells 604A-C, 752A-C, 816A-C, 816D-F, 1008A-C of FIGS. 6A, 7A, 8 and 10A, respectively, and the three switching cells (unlabeled) associated with each of the three multiphase converters 904A-C) and an output 1220. Transformer circuit 1200 may be considered to have a common output node 1224, and each input 1216A-C is connected to the common output node by a double-winding circuit segment 1228A-C that includes a corresponding respective pair of reactor windings 1228A1, 1228A2, 1228B1, 1228B2, 1228C1, 1228C2, each of which may be the same as the others. With this configuration, interphase reactor 1208A is composed of windings 1228A1, 1228B2 corresponding to inputs 1216A, 1216B, respectively, interphase reactor 1208B is composed of windings 1228B1, 1228C2 corresponding to inputs 1216B, 1216C, respectively, and interphase reactor 1208C is composed of windings 1228C1, 1228A2 corresponding to inputs 1216C, 1216A, respectively. In this example, an output inductor 1232 is provided between common output node 1224 and output 1220 of circuit 1200.

The basic layout of circuit 1200 of FIG. 12A can readily be adapted to virtually any number of inputs. For example, averaging transformer 520 of FIG. 5A illustrates the concepts described relative to circuit 1200 of FIG. 12A in the context of two inputs corresponding to outputs 536A-B of the two switching cells 512A, 512B. FIG. 12B, on the other hand, illustrates the basic concepts described relative to circuit 1200 of FIG. 12A in the context of five inputs 1240A-E. In circuit 1204 of FIG. 12B, each input 1240A-E is connected to a common output node 1244 via a corresponding double-winding circuit segment 1248A-E. This configuration of double-winding circuit segments 1248A-E allows the formation of corresponding respective interphase reactors 1212A-E. Those skilled in the art will readily be able to use the basic concepts of each of circuits 1200, 1204, 520 of FIGS. 12A, 12B and 5A to create a suitable circuit for any number of inputs greater than one.

The basic configuration of circuits 1200, 1204, 520 has a number of advantages over the basic configurations of circuits 1100, 1104, 1108 (FIGS. 11A-C), including: 1) the magnetic components, for example, interphase reactors 1208A-C, 1212A-E, can all be identical; 2) any number of inputs can be used (again, FIGS. 12A-B show three and five inputs); 3) the magnetic cores required are simple single phase types that are readily available in any material required; 4) the design of the magnetic components is straightforward and they can be built using traditional methods; and 5) the magnetic circuit can be designed to have a specific common mode inductance, thus eliminating the need for an output inductor.

Switching Pattern Variations

The methods shown so far for generating the timing signal, i.e., the methods that include triangular waveforms, is just the simplest one to explain. There are indeed other methods that will work, including using saw tooth waveforms or asymmetrical triangle waveforms. Also note that the method shown is simply a way of easily visualizing the timing logic. As those skilled in the art will appreciate, this timing could be performed in a digital timing circuit so that it may look quite different, but the result would have the same optimum duty cycle patterns. In addition, switching patterns with different phase shifts and ordering of switches may be used. These variations each tend to optimize certain performance parameters over others. Depending on the application and the operating modes of the power converter, it is sometimes better not to use simple equal spaced timing signals. To aid this description, the following terms are defined: Fs is the per-switch switching frequency; n is the number of phased switching cells; T1 through Tn are the times between the successive voltage signals at each cell; and d is the duty cycle of the switching state. For all multiphase converters the duty cycle, d, of the converters are equal at all times. However, since the switching cycles are time shifted, the duty cycle, d, will not appear equal during times of changing duty cycle.

The timings of all known prior art multiphase converters use equally phased timing, which is most easy to understand and yields the best results for most situations. This can be defined as when the time shift between each phase T1 through Tn are equal to 1/(Fs×n), or equal spacing. This makes the common mode output current ripple have the lowest amplitude and a frequency of Fs×n. Also, the current in the DC bus capacitor is minimized at the worst case operating duty cycles. These occur at d=x/n+1/(2n), wherein x=0, 1, 2, ... n−1. In addition, the DC bus ripple current goes to zero at values of d=x/n for x=0, 1, 2, ... n. The order of the time shifting is unimportant when using the series inductor current summation circuit type (e.g., circuit 1100 of FIG. 11A) or the multi-leg reactor current summation circuit type (e.g., circuit 1108 of FIG. 11C). However, the design of interphase reactors is affected by the choice of signal order when using either the averaging transformer circuit type of the present invention (e.g., circuits 1200, 1204 of FIGS. 12A-B) or the dual input interphase reactor circuit type (e.g., circuit 1104 of FIG. 11B).

The present invention includes varying the delay in different ways and to consider the order in which the signals are connected to the current summation circuit. It is in many cases advantageous to vary the timing of the multiphase switching cells in a different way, for example, to avoid a resonate frequency in the DC source or the load. This can be done by using variations of the timing signal delays. Examples of varying the timing include making the signals of two different delays relative to each other. This can be used to reduce the (Fs×n) frequency in the output and create an (Fs×n/2) harmonic in the output.

Figure 13:
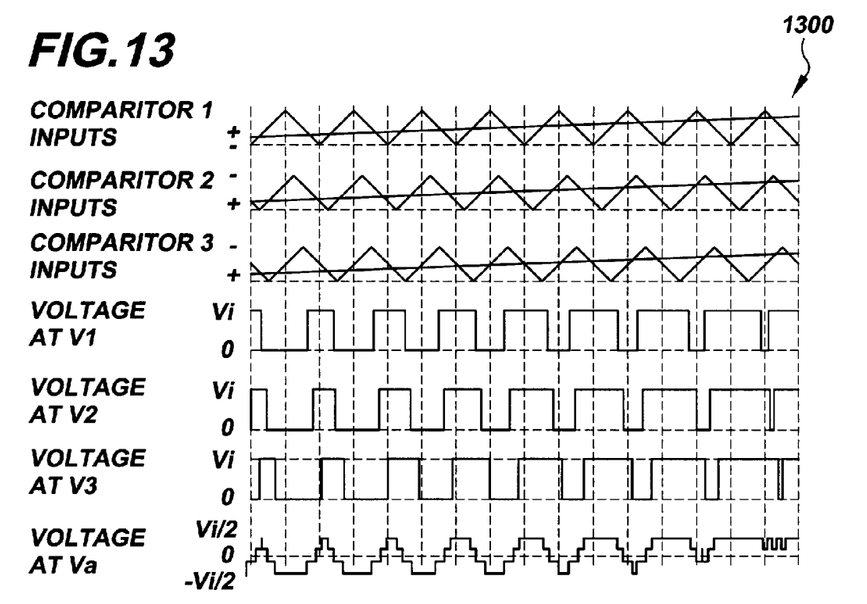
FIG. 13 is a timing and waveform diagram for a PWM timing scheme that utilizes a very small delay between each switching cell output.

Another option, which minimizes the size requirements of the interphase reactors but makes the filter larger, is to use a very small delay between each switching cell output. This turns out to be a very good solution when an AC load acts as a filter, as in the case of a motor drive. The motor inductance filters the current well enough. The multiphase converter in this case is generally similar to a simple six switch motor drive. FIG. 13 contains a timing and waveform diagram 1300 for this variation of PWM timing. The multiphase techniques can be used to parallel multiple multiphase converters and allow active current balancing between parallel drives. Without the interphase transformers and the multiphase synchronization, the parallel converters would circulate a lot of current or, alternatively, require very large inductors that would reduce performance and increase cost. In addition, a multiphase solution will reduce voltage rise time (dV/dT) stress on the motor winding's conducted EMI in the system.

Current Balancing and Control

Figure 14:
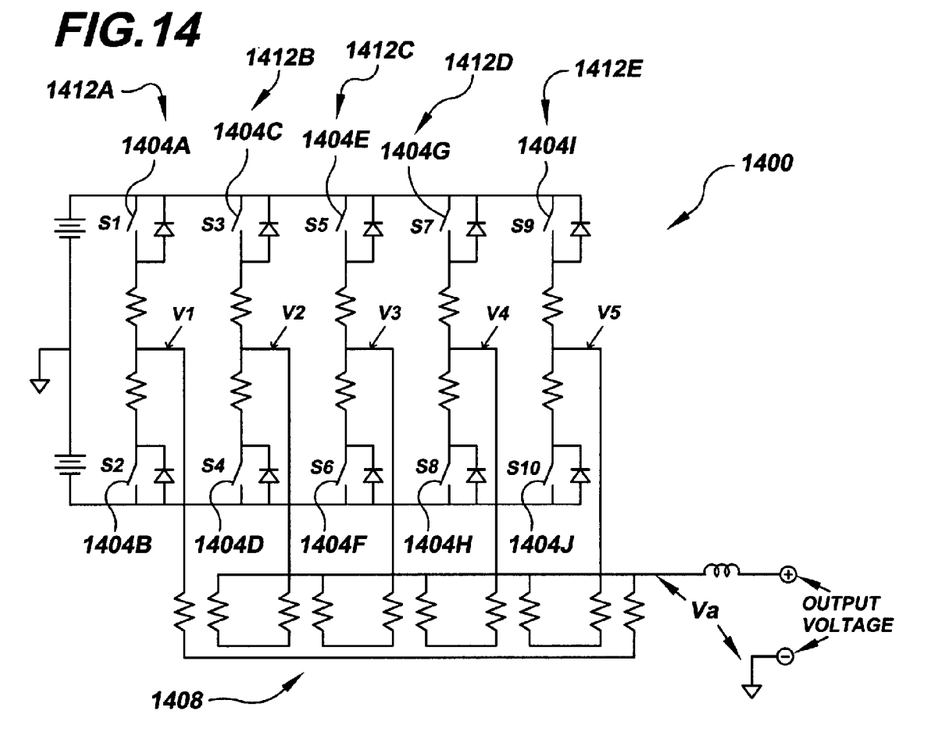
FIG. 14 is a schematic diagram of a multiphase power inverter having five switching cells for illustrating active current balancing.

It is beneficial for multiphase power converters to have active current balancing among the currents output by parallel connected switching cells to compensate for variations in DC current in the cells. In general the current in all switching cells should be equal. The magnetic current summation circuits illustrated in FIGS. 5A, 6A, 7A, 8, 9, 10A and 12A-B, for example, averaging transformers 520, 608, 760, 836A-B and circuits 1200, 1204, are designed to force current sharing at high and medium frequencies. However, at DC these magnetic circuits have little effect on current balance. If the duty cycle of each switching cell and the DC resistance of each parallel current path are equal, then the currents will balance at DC. The problem is that the duty cycles and resistances are not equal. In practice, a current balance of at least 10% over all operating conditions is desired. It is certainly possible, but not always easy, to get the resistances to balance to this degree. However, the voltage balance needs to be extremely good to keep the current balance in this range. FIG. 14 shows the equivalent DC circuit 1400 in the parallel switching circuits. In general, for low losses the DC resistance of circuit 1400 is very low. The most dominant term is the switch-on resistance. The DC voltage at each switching cell is approximately the DC bus voltage multiplied by the switch duty factor. If all switches have the same duty factor, the voltage will be the same. The sensitivity is best described with an example.

As an example of current balancing, consider a five-phase multiphase converter (e.g., circuit 1400 of FIG. 14) at 500 amps using 1200 volt IGBTs with a DC bus voltage of 800 volts. The switches 1404A-J will need to provide 100 amps each. A typical IGBT resistance would be about 0.02 ohms per switch. The magnetic circuit 1408 may have about this much resistance per phase as well, so the total per-phase resistance is 0.04 Ohms. If we assume that four of the switching cells 1412A-D have exactly the same duty factor, these cells can be considered a single cell having 0.005 Ohms of resistance in series. If the fifth cell 1412E has a voltage difference of only 2.5 volts, the circulating current will be 2.5 volts/0.025 Ohms, or 100 amps. This means that the fifth switch 1404I will carry twice its rated current. Since the output voltage of a cell is d/Vdc and all cells have the same Vdc, then to have this difference d would need to be 2.5/800 or 0.31% different. With a switching frequency of 10 kHz, this would be caused by a 100 us*0.31%, or 310 nS, difference in pulse width. To get this error down to 10%, the pulse width needs to be matched to about 31 nS, thus, the need for active current balancing.

Active current balance can be accomplished a number of ways. As mentioned above in connection with multiphase power converter 500 of FIG. 5A, the current of each switching cell, for example, for converter 500, each switching cell 512A-B, can be monitored and controlled individually, or the difference(s) can be monitored and a correction applied to keep the currents the same. In a case to control the DC current difference, a DC bias needs to be controlled in the PWM control circuit, which may adjust the average DC voltage in each switching cell. Another approach to current balancing is to balance the voltages from each switching cell. Rather than active balancing, the voltages out of the individual cells may be monitored and kept in balance since the series resistance can typically be more readily controlled. This passive balancing method will depend on the DC resistance matching, but may be good enough for certain applications.

In each of multiphase power converters 500, 600, 700, 800, 900, 1000 of, respectively, FIGS. 5A, 6A, 7A, 8, 9, and 10A, current output from one of the switching cells, for example, cell 512A, cell 604A, cell 752A, and each of cells 816A, 816D of FIGS. 5A, 6A, 7A, and 8, respectively, is treated as a master current and the current(s) of the remaining cell(s), for example, cell 512B, cells 604B-C, cells 752B-C, cells 816B-C and cells 816E-F, respectively, are compared to the master current. Each of the current differential signal, for example, each of signals 588, 632A-B of FIGS. 5A and 6A, respectively, is filtered to remove high frequencies and added to the PWM control signal, for example, PWM control signals 578, 672, respectively, for the switching cell, for example, cell 512B and each of cells 604B-C, respectively, controlling that current. This feedback does not interfere with the speed of the main regulating circuit response and, thus, makes possible a very high current control bandwidth.

Each of FIGS. 5A, 6A, 7A, 8, 9, and 10A shows one or more current sensors, for example, sensors 590, 636A-B of FIGS. 5A and 6A, respectively, that directly measure the difference between the respective currents. Another effective method is to measure the output currents of the switching cells directly and subtract the current signals in the converter control circuit. In addition, other signals can be measured for use as current balance indicators. For example, one or more voltage signals representing the differential(s) between pairs of switching cell output voltages may be used as control signals to keep currents in balance. As another alternative, since the major source of the current balance error is the variation in delay from the controller output signals to the actual switching of the switching cell voltage, it is also possible to measure the switching cell timing to get the needed balancing information. Those skilled in the art will understand how to implement these alternative balancing schemes.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A multiphase power converter, comprising:
   a number N of switching cells having corresponding respective N switched outputs;
   an averaging transformer, comprising:
      a common output node;
      an output in electrical communication with said common output node;
      N double-winding segments each including a pair of reactor windings in series with one another, each of said N double-winding segments having a first end electrically connected to a corresponding respective one of said N switched outputs and a second end electrically connected to said common output node; and
      N interphase reactors each formed by pairs of said reactor windings in differing ones of said N double-winding segments; and
   a control system for controlling at least said N switching cells, said control system including current balancing circuitry for actively balancing electrical current imbalance between ones of said N switching cells.

2. The multiphase power converter of claim 1, wherein said current balancing circuitry includes N−1 feedback loops including corresponding respective N−1 current-differential sensors for sensing corresponding respective current differentials in differing pairs of said N double-winding segments.

3. The multiphase power converter of claim 1, wherein N is two and includes a first switched output and a second switched output, said averaging transformer comprising:
   a first double-winding segment electrically connected between said first switched output and said common output node and that includes a first reactor winding and a second reactor winding located in electrical series with said first reactor winding;
   a second double-winding segment electrically connected between said second switched output and said common output node and that includes a third reactor winding and a fourth reactor winding located in electrical series with said third reactor winding;
   a first interphase reactor formed in part by said first reactor winding and said fourth reactor winding; and
   a second interphase reactor formed in part by said second reactor winding and said third reactor winding.

4. The multiphase power converter of claim 3, wherein said control system controls said first and second switched outputs, said current balancing circuitry including a feedback loop for controlling said second switched output, said feedback loop including a current-differential sensor for sensing a current differential between said first and second double-winding segments.

5. The multiphase power converter of claim 1, wherein N is three and includes a first switched output, a second switched output, and a third switched output, said averaging transformer comprising:
   a first double-winding segment electrically connected between said first switched output and said common output node and that includes a first reactor winding and a second reactor winding located in electrical series with said first reactor winding;
   a second double-winding segment electrically connected between said second switched output and said common output node and that includes a third reactor winding and a fourth reactor winding located in electrical series with said third reactor winding;
   a third double-winding segment electrically connected between said third switched output and said common output node and that includes a fifth reactor winding and a sixth reactor winding located in electrical series with said fifth reactor winding;
   a first interphase reactor formed in part by said first reactor winding and said fourth reactor winding;
   a second interphase reactor formed in part by said third reactor winding and said sixth reactor winding; and
   a third interphase reactor formed in part by said second reactor winding and said fifth reactor winding.

6. The multiphase power converter of claim 5, wherein said control system controls said first, second, and third switched outputs, said current balancing circuitry including:
   a first feedback loop for controlling said second switched output, said first feedback loop including a first current-differential sensor for sensing a current differential between said first and second double-winding segments; and
   a second feedback loop for controlling said third switched output, said second feedback loop including a second current-differential sensor for sensing a current differential between said first and third double-winding segments.

7. The multiphase power converter of claim 1, wherein N is at least three and said N switched outputs are controlled as a function of a common waveform having differing delays among said N switched outputs.

8. A power converter for providing plural-phased electrical power comprising a plurality of the multiphase power converters of claim 1 electrically connected so as to provide the plural-phased electrical power.

9. A multiphase power converter, comprising:
   a number N of switching cells having corresponding respective N switched outputs, each of said N switched outputs controlled by a corresponding respective at least one switching control signal; and
   a control system for controlling said N switching cells, said control system including:

means for providing N pulse-width modulation (PWM) reference signals respectively to said N switching cells, each of the N PWM reference signals based on a common waveform but having a differing phase relative to each other of the N PWM reference signals;

means for providing N PWM control signals; and means for generating each of said at least one switching control signal as a function of ones of the N PWM reference signals and corresponding respective ones of the N PWM control signals.

10. The multiphase power converter of claim 9, wherein N is at least three.

11. The multiphase power converter of claim 9, wherein N−1 of the N PWM control signals are current balancing feedback signals.

12. The multiphase power converter of claim 11, wherein each of said current balancing feedback signals is a differential current signal.

13. The multiphase power converter of claim 12, further comprising an output averaging transformer electrically connected to said N switched outputs, each said differential current signal being obtained from currents flowing in said output averaging transformer.

14. The multiphase power converter of claim 9, further comprising an output averaging transformer that includes:
a common output node;
an output in electrical communication with said common output node;
N double-winding segments each including a pair of reactor windings in series with one another, each of said N double-winding segments having a first end electrically connected to a corresponding respective one of said N switched outputs and a second end electrically connected to said common output node; and
N interphase reactors each formed by pairs of said reactor windings in differing ones of said N double-winding segments.

15. The multiphase power converter of claim 14, wherein said control system includes N−1 feedback loops including corresponding respective N−1 current-differential sensors for sensing corresponding respective current differentials in differing pairs of said N double-winding segments.

16. The multiphase power converter of claim 9, wherein said means for providing the N PWM reference signals comprises a multiphase waveform generator.

17. The multiphase power converter of claim 9, wherein said means for generating each of said at least one switching control signal includes N comparators for comparing ones of the N PWM reference signals to corresponding respective ones of the N PWM control signals.

18. A method of converting electrical power, comprising:
providing a multiphase power converter that includes a number N of switching cells having corresponding respective N switched outputs;
providing N pulse-width modulation (PWM) reference signals having a common waveform but differing phases;
providing N PWM control signals;
generating at least N switching control signals as a function of the N PWM reference signals and the N PWM control signals; and
driving the N switching cells with corresponding respective ones of the at least N switching control signals so as to cause the N switching cells to provide the N switched outputs.

19. The method of claim 18, wherein said providing of the N PWM control signals includes providing N−1 current balancing feedback signals.

20. The method of claim 19, further comprising obtaining N−1 differential current signals from an averaging transformer.

21. The method of claim 18, wherein said generating of the at least N switching control signals includes comparing ones of the N PWM reference signals with corresponding respective ones of the N PWM control signals.

22. The method of claim 18, wherein said providing of the multiphase power converter includes providing N switching cells each having two switches, said generating of the at least N switching control signals including generating 2N switching control signals.

23. The method of claim 18, further comprising averaging the N switched outputs.

24. The method of claim 23, wherein said averaging of the N switched outputs includes using an averaging transformer comprising N loops and N interphase reactors formed between the N loops, wherein each of the N loops includes two interphase reactor windings in electrical series with one another and each of the two interphase reactor windings is part of a corresponding respective one of the N interphase reactors.

25. The method of claim 24, wherein said providing of the N PWM control signals includes measuring differential currents as between differing pairs of the N loops.

26. The multiphase power converter of claim 9, wherein said control system includes current balancing circuitry for actively balancing electrical current imbalance between ones of said N switching cells.

27. The method of claim 18, wherein said providing of the N PWM control signals includes actively balancing electrical current imbalance between ones of said N switching cells.

* * * * *